Sept. 30, 1969   R. E. KISSELL   3,469,706

FILTER CARTRIDGE

Filed Dec. 2, 1966

INVENTOR.
RONALD E. KISSELL
BY
Staelin & Overman
ATTORNEYS

United States Patent Office 3,469,706
Patented Sept. 30, 1969

3,469,706
FILTER CARTRIDGE
Ronald E. Kissell, Newark, Ohio, assignor to Owens-Corning Fiberglas Corporation, a corporation of Delaware
Filed Dec. 2, 1966, Ser. No. 598,840
Int. Cl. B01d 27/02, 25/20
U.S. Cl. 210—448                                    3 Claims

ABSTRACT OF THE DISCLOSURE

A cylindrical filter cartridge for fluids having an outer rigid cage and an inner filter insert of a fibrous material. The filter insert is secured within the shell between a first end cap secured to the edges of one end of the shell and a second end cap placed within said shell at an axial distance from said first end cap determined by the axial length of said fibrous insert when under compression at a predetermined axial pressure. The end caps include adhesive and mechanical means for sealingly engaging the adjacent ends of the fibrous inserts to prevent fluid leakage therebetween.

---

This invention relates to an improved construction for a filter cartridge and the method of its manufacture. More specifically, this invention relates to an improved construction for a filter cartridge having an outer rigid cage circumjacent a filter insert which comprises a replaceable filter cartridge to be inserted within a suitable housing for the filtration of fluids.

While the invention is described in detail in terms of the construction of a filter cartridge to be used for the filtration of liquids such as hydrocarbon fuels, etc., and in which the cartridge is a hollow cylindrical member adapted to fluid flow in a radially inward direction, it is to be understood that the concepts of this invention may be incorporated in other installations for filtering units which include a replaceable cartridge having a rigid outer cage with filter media positioned therein.

In the design and manufacture of filter cartridges of the described type having a rigid, usually metallic, outer cage with a filter insert of glass fibers, paper, etc., positioned therein, one of the difficulties encountered is the prevention of unintentional fluid or liquid leakage between the rigid housing and the filter insert, due to the poor fit of the parts caused by dimensional variations inherent in the manufacture of the elements making up the cartridge. While standard production methods are capable of maintaining satisfactory dimensional tolerance for rigid or metallic parts, such as the outer cage of the cartridge, the filtering or porous insert, which may be of glass fibers, pleated paper, etc., may vary considerably in size.

Specifically, in the case of an elongate cylindrical filter cartridge including an outer rigid cage and inner fibrous filter member, it is necessary that the inner member be engaged to portions of the outer cage to rigidly position it therein and also to prevent the flow of fluids between the attached portions, as will be subsequently explained. Because dimensional tolerances in the manufacture of the fibrous filter inserts are quite large, it is often necessary to hand-fit or selectively discard certain of the inserts which do not present the necessary dimension required to effect proper joinder between the parts to assure a mechanically strong and leakproof seal. For example, in the manufacture of a filter cartridge of the type described for use in the filtration of gasolines, a common cartridge to be used in the filter housing is a hollow cylinder approximately eight inches long. As previously stated, the rigid metallic cage may be mass produced within a tolerance of several thousandths of an inch, but the fibrous filter insert may have an axial length variation as large as one-sixteenth inch. Accordingly, in the manufacture of such a cartridge in which the fibrous insert is secured within the cage between a pair of end caps, if the filter insert is too short, it will be impossible to obtain a good mechanical and leakproof seal therebetween. If the filter insert is too long, it may also be impossible to attach the end caps to the outside of the rigid cage.

Accordingly, it is an object of this invention to provide a filter cartridge of a novel construction which permits, under mass production techniques, the manufacture of filter cartridges of the type described which provide uniformly good mechanical and liquid seals between the outer rigid cage and the inner cartridge.

It is another object of this invention to provide a method of manufacturing filter cartridges having an outer, rigid cage and an inner filter insert, which method can accommodate the large dimensional variations in the size of the filter insert and provide an end product having uniformly good mechanical and leak-tight joints between the outer cage and the inner insert.

It is still another object of this invention to provide an improved cartridge for the filtration of liquids, which cartridge comprises an outer, rigid cage and an inner filtration insert positioned therein and held by a pair of end caps secured to either end of the cage and secured to the axial ends of the filter insert.

It is yet another object of this invention to provide a method of manufacturing a hollow cylindrical filter cartridge having an outer perforate cage and an inner hollow cylindrical fibrous filtration member secured within the outer cage in contact with a pair of end caps which are secured to the axial end of the filter member and to the axial end of the outer cage.

Other objects and advantages of this invention will be apparent from the following detailed description of a preferred embodiment thereof, reference being made to the accompanying drawings in which.

Figure 1:
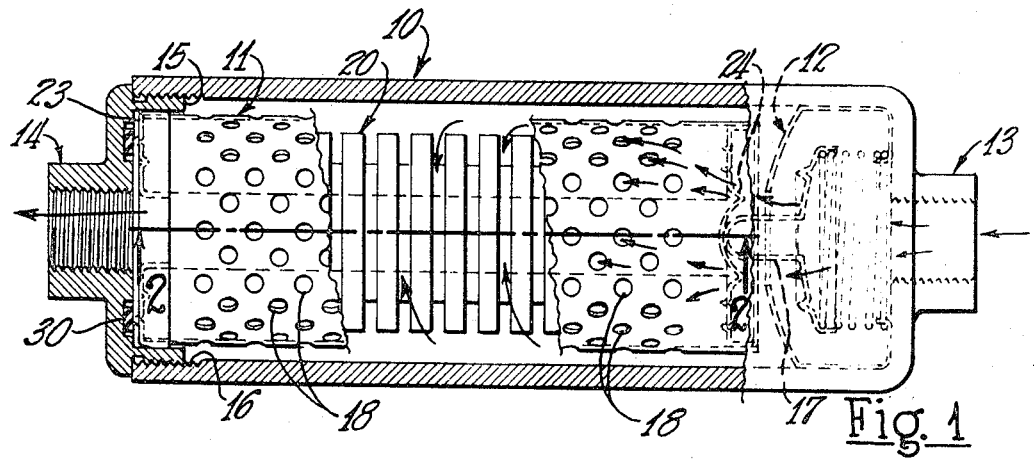
FIGURE 1 is a cross sectional view, with portions broken away, of a complete filtration unit which utilizes a filter cartridge of this invention, showing the cartridge with its outer rigid cage and inner filtration member as it would be positioned within the filter housing and illustrating the direction of fluid flow therethrough.
Figure 2:
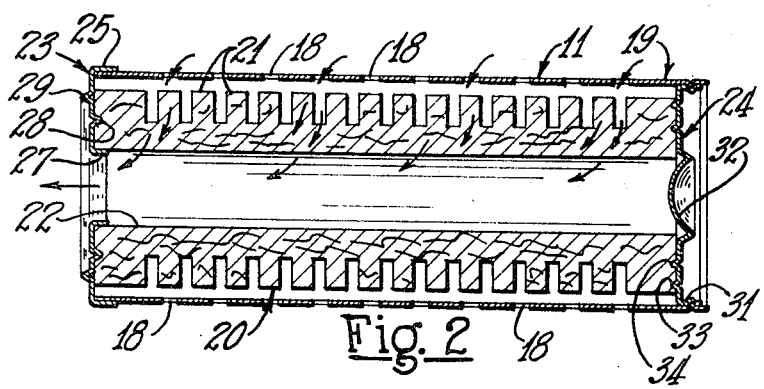
FIGURE 2 is a cross sectional view of the filter cartridge shown within the housing in FIGURE 1, taken along line 2—2 of FIGURE 1, and illustrating particularly the manner in which the filter insert is secured and positioned within the outer rigid cage by the pair of end caps secured to the ends of the cage.
Figure 3:
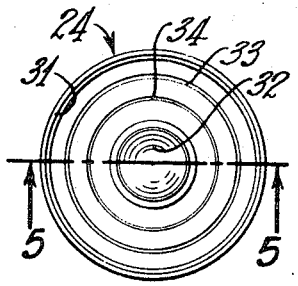
FIGURE 3 is an end view of one of the end caps secured to the outer cage, as shown in FIGURES 1 and 2, illustrating the circular ridges or raised portions thereof.
Figures 4, 5:
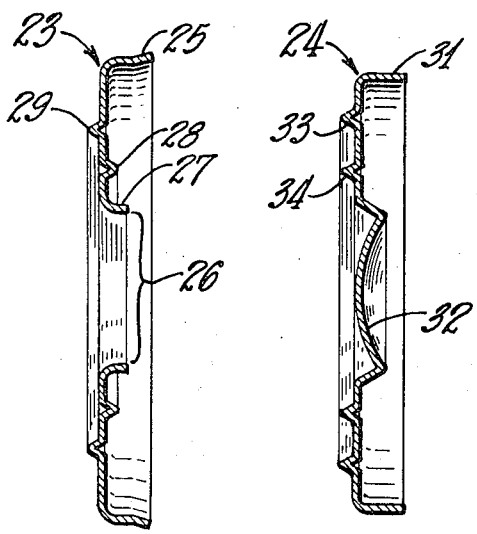

FIGURE 4 is a cross-sectional view, on an enlarged scale, of the left hand or outlet end cap shown in FIGURES 1 and 2; and FIGURE 5 is a cross-sectional view of the right hand or inlet end cap shown in FIGURES 1 and 2, but shown on an enlarged scale as it would be seen on line 5—5 of FIGURE 3.

Referring specifically to FIGURE 1, an entire filter unit including an outer housing 10 containing the improved filter cartridge 11 of this invention, is shown as a complete assembled unit with the cartridge 11 positioned therein and depressing a check valve 12 which is commonly used in such assemblies to prevent the unintentional flow of liquid through the housing 10 when no cartridge 11 is in place. Such constructions are used in the filtration of automotive fuel and are commonly attached to the hose of the fuel pump in an automobile service station with the inlet or hose end secured to a threaded housing inlet 13 and with the nozzle or outlet secured to a threaded cap 14 of the housing 10. As seen in FIGURE 1, the outlet cap 14 has an externally threaded flange 15 which positions the cartridge 11 axially within the housing 10 by means of a slip fit. The flange 15 is screwed into the main body of the housing 10 which has interior threads 16 on its open end. The check valve 12, the details of which are not important in this application, includes a spring biased detent 17 which, when a cartridge 11 is inserted and the outlet cap 14 is threaded in place, is depressed by the cartridge to open the check valve 12. Conversely, when no cartridge 11 is present in the housing, the check valve 12 is released to its closed position by the detent 17.

The housing 10 shown in FIGURE 1 is designed for filtering a fluid which enters the inlet end 13 and follows the flow path indicated by the arrows which extends through the check valve 12 radially inwardly through perforations 18 in the rigid outer cage of the cartridge 19, thence radially inwardly through the cyclindrical filter member 20 and then axially through the exit in the outlet cap 14. The direction of fluid flow is also indicated by arrows in FIGURE 2.

Referring specifically to FIGURE 2, the filter cartridge 11 includes the hollow cylindrical perforate cage 19, which as previously explained, is preferably fabricated from sheet metal or other rigid material and the hollow cylindrical filter insert 20. The filter insert, as shown, has a plurality of circumferential lands 21 on its outer surface to increase the effective filter area and an axially extending passage 22 therethrough. The filter insert 20, which is the filtration media, may be comprised of any suitable filtration material, such as pleated paper, etc., but in this preferred embodiment, is comprised of resin impregnated fibers.

Because such filters of resin impregnated fibers are capable of filtering out or retaining particles as small as 1 micron, in the manufacture of filter assemblies having this efficiency, a construction which absolutely prevents any leakage of filtrate or liquid around the filter member is most important. In the manufacture of such cartridges as shown in FIGURES 1 and 2, one of the basic difficulties in assuring against such leakage is the method of attaching the filter insert 20 within the rigid cage 19 by means of a pair of end caps 23 and 24 which, as best seen in FIGURE 2, support the filter insert 20 on each of its axial ends and are secured to the axial ends of the rigid cage 19.

In this particular illustration, the configuration of the end cap 23, which is the left hand cap adjacent the nozzle or outlet cap 14 of the housing, is different from the configuration from the end cap 24 which is the hose cap adjacent the inlet end 13 of the housing. Referring to FIGURE 4, the nozzle cap or end cap 23 is a generally planar disc-shaped member having an inturned flange 25 of a diameter slightly larger than the diameter of the rigid cage 19. A central aperture 26 in the end cap 23 is surrounded by an inner flange 27 which, as seen in FIGURE 2, fits within the passage 22 in the filter insert 20. Between the inwardly facing flanges 25 and 27, a circular raised portion or groove 28 extends from the generally planar surface inwardly and a second circular raised portion or groove 29 extends outwardly from the plane of the disc. As will subsequently be explained in detail, when the nozzle cap or end cap 23 is in position on the left end of the cage 19, as is shown in FIGURES 1 and 2, and the filter insert 20 is positioned therein, the circular raised portion or groove 28 embeds into the end of the filter insert 20 while the outwardly extending groove 29 provides a bearing surface for engagement or contact with an annular gasket or washer 30 which is positioned on the inner face of the outlet cap 13. The second groove 29 permits larger out of squareness (parallelism) of the housing end gasket 30 and nozzle end cap 23. This out of squareness condition may be caused by the valve plunger, which locates the hose end of the filter, not being on a common center line with the housing or the nozzle end cap 23 may be assembled out of square with the cage 19.

Referring to FIGURE 5, the end cap 24 is a generally planar disc-like member having an outwardly turned flange 31 of a diameter adapted to be received by and fit within the cylindrical cage 19, as seen in FIGURE 2. Because of the type of filter illustrated herein, the hose cap or end cap 24 does not have a central aperture but rather has an indented portion 32 in the center of the cap 24 which provides an impression for receiving and guiding the detent 17 of the check valve 12. Between the indented portion 32 and the outer flange 31 are a pair of inwardly extending raised portions or grooves 33 and 34 which, as seen in FIGURE 2, rest upon and are embedded into the adjacent end of the filter insert 20 when the cartridge is assembled, as will be subsequently explained in detail.

In the filter cartridge illustrated, it is imperative that the junction between the end caps 23 and 24 and the adjacent end of the filter 20 be mechanically sound, because these are the only surfaces that support the filter member 20. It is equally imperative that these junctions also be liquid tight or leakproof. Without a good liquid seal, leakage of fluid from outside the filter member 20 through the junction between the ends of the filter 20 and the inner faces of the end caps 23 and 24 into the axial passage 22, would partially or completely destroy the filter efficiency of the filter which as previously explained, may be required to be as high as one micron. Accordingly, it is a primary purpose of this invention to provide a construction and a method for assembling this construction which will assure a mechanically sound and leakproof junction, regardless of possible large dimensional variation in the axial length of the filter member 20.

As previously explained, in the manufacture of filter inserts 20 of glass fibers, the axial lengths may vary by as much as plus or minus $\frac{1}{16}$ inch in an eight inch filter. This large variation in size can be accommodated by the construction of the filter cartridge of this invention.

Referring to FIGURE 2, the nozzle cap or end cap 23 is initially attached to the rigid cage 19 by permanently securing the flange 25 to the outer edge of the cage 19. Depending upon the composition of the material from which the cage 19 and end cap 23 is formed, this joint may be either welded, soldered, brazed, or otherwise securely fastened. The cage 19 and the end cap 23 could be formed or drawn from a single piece of material.

As previously explained, the hose cap or end cap 24, shown in detail in FIGURE 5, is designed to fit within the other end of the cage 19 with its flange 31 adjacent the inner walls of the cage 19. When the filter insert 20 is positioned within the cage 19 with its left hand terminal face resting against the inner edge of the raised portion 28 of the end cap 23, the hose cap or end cap 24 may be placed within the cage 19 and pushed to the left, as shown in FIGURE 2, until the edges of the raised portions or grooves 33 and 34 contact the right hand end face of the filter insert 20. Additional pressure or force exerted upon the end cap 24 will cause the raised portions or grooves 28, 33, and 34 of the two end caps 23 and 24 to become embedded in the material comprising the filter insert 20, and thus securely engage the filter insert 20. When the filter insert 20 has been compressed between the two end caps 23 and 24, the end cap 24 is then secured in that position within the outer cage 19 by crimping, stamping, soldering, welding, staking or otherwise affixing the flange 31 on the end cap 34 to the inner edges of the cage 19.

Thus, it will be apparent that the position of the end cap 24 relative to the cage 19 is determined by the axial length of the filter insert 20, and not by the axial length of the cage 19. This construction, which positions the end cap 24 by the axial length of the filter insert 20, will accommodate a large dimensional variation, as much as 1/16 inch, in the axial length of the filter insert 20, and insure a mechanically sound and leakproof seal between the end caps 23 and 24 and the filter insert 20.

One method of positioning the end cap 24 so that the grooves 28, 33 and 34 of the end caps 23 and 24 are sufficiently embedded into the material of the filter insert 20 is to apply a predetermined pressure against the end cap 24 to assure substantial penetration of the grooves 28, 33, and 34 without crushing or injuring the filter insert 20 from excess pressure. It has been found that for filters of the type described using a resin impregnated glass fiber filter insert 20, that a pressure of thirty pounds per square inch exerted against the end cap 24 is sufficient to embed the grooves 28, 33, and 34 but insufficient to otherwise harm the filter. A suitable jig using spring controlled force may be used for this purpose.

It has also been found that a suitable adhesive may be advantageously used between the inner faces of the end caps 23 and 24 and the adjacent ends of the filter insert 20. In the manufacture of a filter designed for use with gasoline or other hydrocarbon fuels, an acrylic, rubber, or polysulfide adhesive or sealant is most satisfactory.

In addition to the previously enumerated advantages of the construction and method of this invention, other advantages have been found. Firstly, when using an adhesive sealant between the inner faces of the end caps 23 and 24, because the end cap 24 is fixed within the cage 19 at a position determined by the length of the filter insert 20, when the end cap 24 is fixed relative to the cage 19, a back pressure (30 p.s.i. in the previous example) is retained, thus obviating the necessity for waiting for the adhesive to set. Secondly, it has been found that the impressions in the fiber filter material caused by the raised portions or grooves 28, 33, and 34 cause the adhesive to migrate to the area, thus forming a concentrated ring of adhesive which is substantially liquid impervious. Also, an effective circular "pocket" for the adhesive or sealant is formed between the grooves 33 and 34 on the end cap 24 and between the groove 28 and the inner flange 27 on the nozzle cap 23. This concentration further assures a mechanically sound and leakproof joinder between the end caps 23 and 24 and the filter insert 20. Also, when assembling a series of filters of predetermined size, once the optimum pressure (30 p.s.i. in the previous example) has been established for a given filter size, otherwise hidden defects in the construction of the filter insert may become apparent due to collapse of the insert at this pressure which has been determined to be acceptable for filter inserts without any defects. Finally, because both of the end caps are rigidly held in relation to the outer cage 19, external forces such as that exerted by the spring of the check valve 12 will not affect the position of the end caps 23 and 24 or their attachment to the filter insert 20. Thus, the construction of this invention has the advantages of a "floating end cap" in which the end cap 24 would be directly attached only to the filter insert 20, but also retains the advantages of a construction in which each of the end caps are rigidly attached to the rigid cage 20.

It will be seen that a filter cartridge constructed in accordance with the described method will have a dimensional variation between the two end caps due to the dimensional variations in the length of the filter insert 20. Thus, in the example of FIGURE 2, the axial distance between the indented portion 32 on the end cap 24 to the top of the ridge 29 on the end cap 23 may vary by as much as 1/16 inch for an eight inch filter. This variation, however, is not critical because the axial movement of the detent 17 on the check valve 12 can accommodate variations of this magnitude. Also, because the axial length of the cage 19 is fixed, other housings may utilize this fixed length for positioning the cartridge within the housing and not depend upon contact with the end caps to hold the cartridge in place.

It will be apparent that various changes and modifications will be made in the specific details discussed above and described in the preferred embodiment, without departing from the scope and spirit of the attached claims.

I claim:
1. A cylindrical filter cartridge comprising, in combination, a hollow cylindrical rigid cage having a predetermined length, a first end cap positioned on and secured to one end thereof in fixed relation therewith, a cylindrical fibrous filter insert of a length less than the length of said cage positioned within said rigid cage with one end in contact with said first end cap and with its other end generally adjacent the other end of said cage, a second end cap adapted to be received within said cylindrical cage and having a circular outer surface in contact with the inner wall of said cylindrical cage, and means for securing said second end cap at the position within said cylindrical cage determined by the length of said fibrous insert such that when said second end cap is pushed against said fibrous insert to a position within said caged member and is secured within said cylindrical cage, said fibrous member will remain in close contact with said end caps.

2. A cylindrical filter cartridge comprising a hollow elongate rigid cage having a predetermined length, a first end cap secured to one end of said cage, an elongate fibrous filter insert of a length less than the length of said cage positioned within said cage with one end against said first end cap and the other end generally adjacent the other end of said cage, a second end cap adapted to be slidingly received within said cage and having an outer peripheral surface adjacent to the inner surface of said hollow cage, and means to secure said outer peripheral surface of said second end cap to adjacent portions of said inner surface of said cage at a position determined by the length of said fibrous filter insert whereby said second end cap closely engages said other end of said fibrous insert.

3. A tubular filter cartridge comprising a tubular outer shell having a perforate cylindrical wall, an annular end cap having a central opening and secured to one end of said tubular outer shell at its periphery, a tubular fibrous insert having an outer diameter less than the inner diameter of said shell and an inner diameter substantially coextensive with said central opening of said annular end cap and having a length established by axially compressing said fibrous insert under a predetermined pressure against said annular end cap with its end opposite from said annular end cap lying within the length of said tubular outer shell, a closed circular end cap positioned against said opposite end of said fibrous insert and within said outer tubular shell and means on said outer shell engaging said closed end cap for retaining said closed end cap and said fibrous insert within said shell under said predetermined pressure.

References Cited

UNITED STATES PATENTS 2,659,128  11/1953  Baldwin et al. _____ 55—387
3,164,506   1/1965  Lake _____ 210—487 X

FOREIGN PATENTS 739,505  11/1955  Great Britain.

REUBEN FRIEDMAN, Primary Examiner

T. A. GRANGER, Assistant Examiner